May 30, 1961  R. S. SANFORD  2,986,239
LIQUID COOLED BRAKE SHOE FOR VEHICLES
Filed Dec. 27, 1956  2 Sheets-Sheet 1

INVENTOR
Roy S. Sanford
BY *Scrivener & Parker*
ATTORNEYS

May 30, 1961 R. S. SANFORD 2,986,239
LIQUID COOLED BRAKE SHOE FOR VEHICLES
Filed Dec. 27, 1956 2 Sheets-Sheet 2
FIG. 3
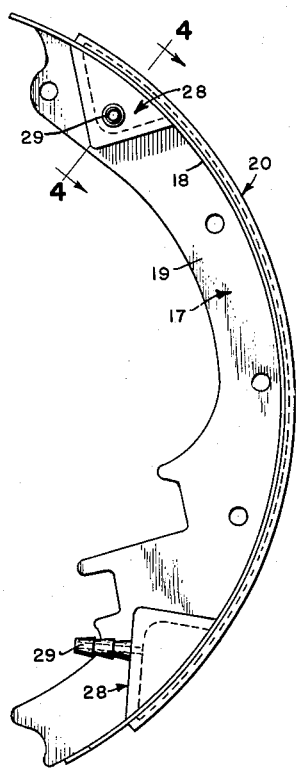
FIG. 4
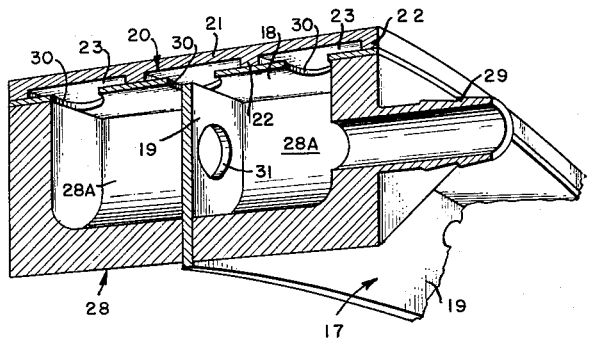
FIG. 6
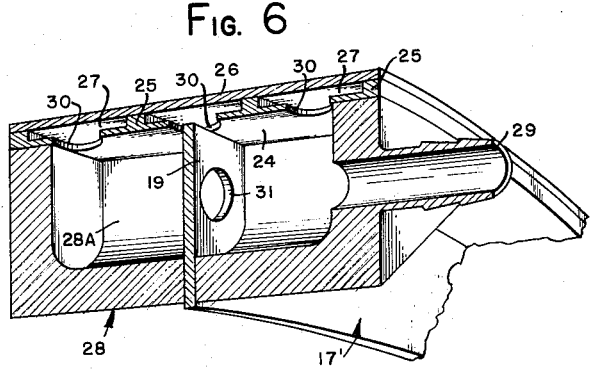
FIG. 5
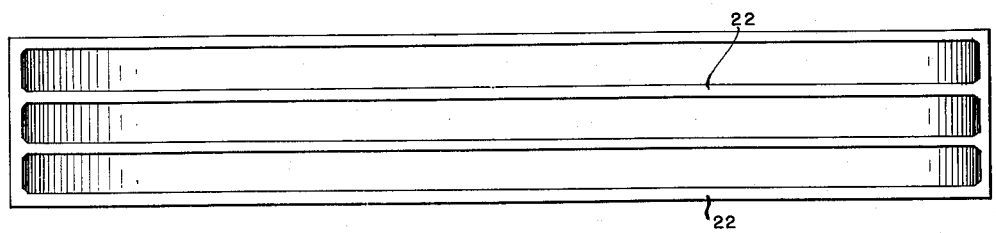
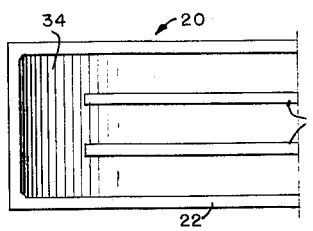
FIG. 7
INVENTOR
Roy S. Sanford
BY Scrivener & Parker
ATTORNEYS

United States Patent Office 2,986,239
Patented May 30, 1961

2,986,239

LIQUID COOLED BRAKE SHOE FOR VEHICLES

Roy S. Sanford, Woodbury, Conn. (Box 400, Seymour, Conn.), assignor to Roy S. Sanford, Wilfred A. Eaton, Erling D. Sedergren, all of Woodbury, and Roger H. Casler and James O. Eames, both of Washington, Conn.

Filed Dec. 27, 1956, Ser. No. 630,919

2 Claims. (Cl. 188—264)

This invention relates to improvements in liquid cooled vehicle brakes and refers particularly to improvements in a liquid jacketed brake shoe which will not warp or be distorted under operating conditions.

Liquid cooled brakes are particularly adaptable where relatively high energy dissipations are required at the braking surfaces. At relatively high energy dissipation uncooled brakes are ineffective since the high temperatures developed are ruinous to the friction material or brake lining used and also such high temperatures have a deleterious effect upon the metal brake shoes which engage the lining.

It has heretofore been proposed to use liquid cooled brakes both of the disc or axially applied type and the arcuate or radially applied type. However, difficulty has been encountered by the prior art devices, particularly in connection with the arcuate or radially applied type since the cooled element, usually the brake shoe, has a jacketed working surface which tends to warp or distort at the relatively high temperatures encountered and, hence, the working surface of the brake shoe makes non-uniform contact with the lining, reducing the effectiveness of the brakes and causing localized overloading and excessive wear upon both elements of the brake.

The present invention is particularly directed to the provision of a liquid cooled brake shoe of the arcuate, radially applied type wherein the working or braking surface of the shoe is constructed of a metal having high heat conductivity; can be made relatively thin, to permit rapid heat transfer from the heat generating zone to the liquid coolant; and whose construction is such as to inhibit warping, buckling or distortion at relatively high energy dissipations.

Briefly described the present invention contemplates an arcuate plate having a working or braking surface, the plate being constructed of metal having properties of high heat conductivity, said plate comprising one wall of a liquid jacket and being stiffened or reinforced by ribs which preferably extend longitudinally of the plate within the jacket, the ribs functioning both as reinforcing members for the plate and as heat conductive members for facilitating the transfer of heat from the plate to the liquid cooling medium.

In general, the invention may take two forms; the preferred form wherein the ribs are constructed as a part of the plate and are constructed of the same material comprising the plate, or, an alternate form wherein the ribs are separate from the plate or are constructed as part of the shoe proper and wherein the plate is of uniform thickness throughout its area.

The objects, advantages and features of the present invention, together with the detailed construction thereof will be more apparent from the accompanying drawings and following detailed description.

In the drawings:

Fig. 3 is a side elevational view of a brake shoe embodying the features of the present invention.

Fig. 4 is a transverse sectional view taken on line 4—4 of Fig. 3.

Fig. 5 is an inner face view of the plate employed in the brake shoe illustrated in Figs. 3 and 4.

Fig. 6 is a sectional view similar to Fig. 4 showing a modification of the invention.

Fig. 7 is a partial inner face view of a modified friction plate, and

Figure 1:
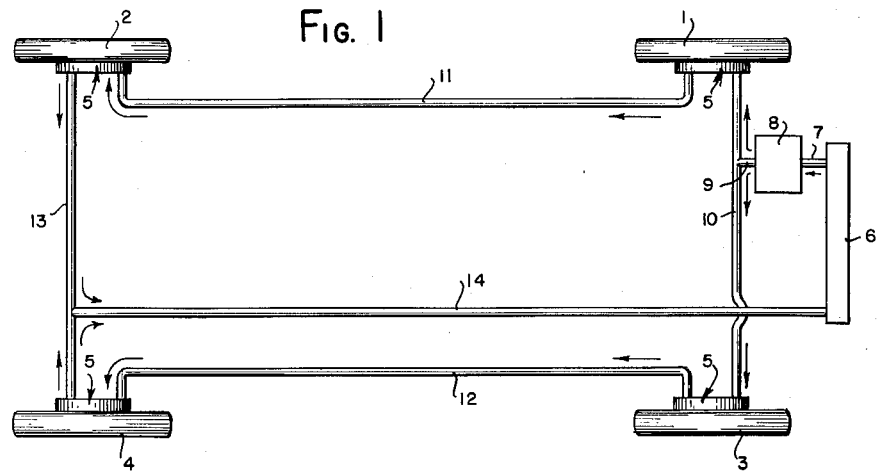
Fig. 1 is a diagrammatic view of a vehicle having liquid cooled brakes as contemplated in the present invention, a typical piping system for the circulation of cooling liquid being shown.

Referring in detail to the drawings, the reference numerals 1, 2, 3, and 4 respectively indicate a front wheel, a rear wheel on the same side, an opposite front wheel and a rear wheel on the opposite side of a conventional automotive vehicle. Each of the wheels carry brakes 5, all of which are of similar construction and will be described in detail, hereinafter. A radiator 6 is connected by pipe 7 to the inlet of pump 8, which is preferably of the positive displacement type and the outlet thereof is connected by a pipe 9 to a header 10 which at its opposite ends connects, respectively, with the brakes 5 of the opposite front wheels 1 and 3. A series pipe 11 connects the outlet of brake 5 on wheel 1 to the inlet of brake 5 on wheel 2 and, in similar fashion, a series pipe 12 connects the outlet of brake 5 on wheel 3 to the inlet of brake 5 on wheel 4. A header 13 is connected at its opposite ends to the outlets of brakes 5 on the rear wheels, and a return pipe 14 connects header 13 to the radiator 6.

Thus a liquid circulating system is provided with the conventional automobile radiator functioning as a reservoir, the flow being in series through a front wheel brake and a rear wheel brake on the same side of the vehicle, and in series through the front wheel brake and the rear wheel brake on the opposite side of the vehicle. The brakes on opposite sides of the vehicle are thus connected in parallel with each other.

It is to be understood that other systems of liquid flow are also contemplated, for instance where all brakes may be connected in parallel with each other, or all brakes connected in series with each other, or the two front wheels and the two rear wheels connected in series-parallel with each other. In addition, if desired, a separate reservoir may be employed instead of the automobile radiator and if further desired, the coolant discharged from the pump may be mechanically refrigerated before or after its passage therethrough. The brakes may be actuated either hydraulically, mechanically or in any other conventional manner.

Each of the brakes 5 comprise a brake drum 15, the inner surface of which, unlike conventional internally expanding brakes, carries a friction lining 16.

Each of the brakes 5 comprise opposed shoes 17 which are of identical construction and are actuated to be applied by conventional means (not shown). A shoe 17 shown in detail in Figs. 3, 4 and 5 will be hereinafter more fully described.

Each shoe 17 comprises an arcuate platform or platform portion 18 reinforced on its concave side by a web 19. The platform 18 and web 19, which form a strength member, are of conventional construction, with the differences noted hereinafter, and both parts are preferably constructed of steel and welded together.

As a feature of the present invention, an arcuate plate 20 is positioned upon the convex face of the platform 18 and is substantially coextensive in width with said platform, the length of the plate being slightly shorter, arcuately, than platform 18. The plate 20 is constructed of a metallic material having relatively high thermal conductivity, adequate strength and a melting point sufficiently high to withstand the intended service. Pure, bus bar or electrolytic copper is a metal which has been found to possess the requisite properties, but some copper alloys may be used. Sterling silver also possesses the requisite properties. In general, if a copper alloy or other metal is employed it should have a melting point of at least 1500° F. and a thermal conductivity at least 40% of that of pure electrolytic copper.

The plate 20 in the preferred form of the invention comprises a working portion 21 having a relatively smooth convex working surface which is adapted to frictionally engage the brake lining 16. The rear face of the working portion carries a plurality of longitudinal ribs 22 which preferably extend throughout substantially the entire length of the face, as shown best in Fig. 5. The ribs 22 are preferably formed integral with the working portion 21 and shaped for supporting engagement with the convex surface of the platform, and at least the lateral marginal ribs are brazed to the lateral edge portions of the platform 18. One way in which the plate may be constructed where the ribs 22 are formed integral with the working portion, is to mill the rear face of the working portion to form spaced elongated grooves therein separated by the spaced ribs 22. Of course, if desired, the ribs 22 may be formed separately from the working portion 21 and may be brazed thereon in the spaced relation illustrated.

Thus a plurality of jacket spaces 23 are provided between the plate 20 and platform 18 through which a cooling liquid may be circulated and to which the heat from the working portion 21 may be transferred. By the provision of the ribs 22 upon the concave side of the working portion 21, and by the use of a material for the working portion having relatively high thermal conductivity and requisite melting point, the brake is characterized by being able to handle high energy dissipation without buckling. Thus, the working portion 21 may be made thinner, which is conducive to a greater rate of heat transfer, than would be the case were no ribs provided. In addition, direct metallic heat conducting paths are provided through the depth of the ribs to the platform 18 which latter is also in contact with the cooling liquid.

If desired the ribs may be so constructed as to provide communication between adjacent space 23, however ribs which are disposed longitudinally with respect to the plate and platform and substantially coextensive in length with the plate and platform are preferred.

A modification of the invention is illustrated in Fig. 6 wherein a platform portion 24 of brake shoe 17′ carries spaced longitudinally disposed ribs 25 and the working portion 26 comprises a relatively flat arcuate member. In this form of the invention working portion 26 may be constructed of copper, silver or a copper alloy having the characteristics enumerated for plate 20, hereinbefore described, and said working portion 26 may be brazed to at least the lateral edge-defining ribs 25. In this form of the invention the ribs 25 function as supports for the working portion 26 and diminish the tendency of said working portion to buckle or warp under the high loads.

To introduce the cooling liquid into the jacket spaces 23 in the preferred form of the invention and into jacket spaces 27 in the form of the invention illustrated in Fig. 6, plenum chamber members 28 having plenum chambers 28a therein may be carried upon the concave portions of the platforms 18 and 24 adjacent the opposite ends of the plates 20 and 26. A nipple 29 may be carried by each plenum chamber whereby liquid may be introduced and/or discharged from the hollow interiors of said chambers. Apertures or connections 30 may be provided in platforms 18 and 24 whereby cooling liquid from the chambers 28 may pass to the jacket spaces 23 and 27 and within each chamber, per se, and apertures 31 may be provided to permit communication through web 19.

A plenum chamber 28a at one end of each plate 20 or 26 functions as the inlet for the jacket spaces and the chamber at the opposite end of said plates functions as the outlet for said jacket spaces. Thus liquid is caused to circulate through said jacket spaces cooling the working portions 21 and 26 through which the generated heat readily travels.

Figure 2:
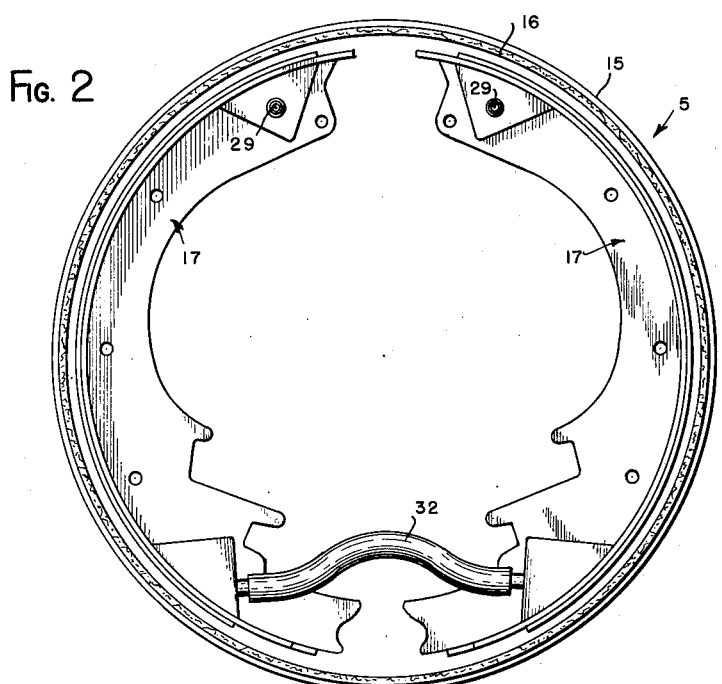
Fig. 2 is a face view of one of the brakes showing the relative positions of the brake elements.

In each brake 5 corresponding plenum chambers 28a are connected by a flexible connector 32 (Fig. 2) whereby the jacket spaces in the two brake shoes constituting each brake 5 are connected in series with each other, the opposite plenum chambers of the two shoes functioning respectively as inlet and outlet for the brake.

If the ribs are so formed as to permit communication between adjacent spaces 23, only one plenum chamber may be employed the interior of which may be divided to provide an inlet and outlet compartment. In this arrangement, the communicating openings in the ribs between adjacent spaces 23 will be so arranged as to cause the cooling liquid to move through adjacent spaces in series, the liquid entering and returning through separate inlet and outlet compartments of the single plenum chamber.

Figure 8:
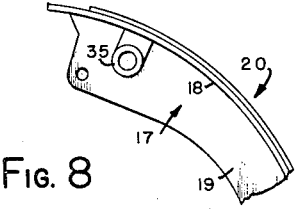
Fig. 8 is a side elevational view of a modified brake shoe.

If desired, the plenum chamber members 28 may be dispensed with as shown in Figs. 7 and 8 of the drawing. Referring first to Fig. 7, it will be noted that the ribs 22 do not extend to the end of the metal friction plate, and that plenum chambers 34 are thus formed at either end of the plate, it being understood that the other end of the plate is constructed in the same manner as shown in Fig. 7. Referring now to Fig. 8, the plenum chambers 28, shown in Fig. 3, are dispensed with, and elbows 35 are welded to the platform 18 adjacent either end of the brake shoe in such a manner as to register with the plenum chambers 34 formed in the metal friction plate which is secured to the outer surface of the platform. These elbows serve as inlets and outlets to the plenum chambers at opposite ends of the brake shoe.

It will be evident from the foregoing specification, that a novel and efficient brake shoe construction has been provided, wherein provision has been made for subjecting a thin metal friction element to the action of a circulating cooling liquid and for also supporting the element against distortion by the forces acting thereon during a brake application. This is particularly advantageous when thin copper, a ductile and easily distorted metal, is utilized as the metal friction element.

Although the invention has been illustrated and described with considerable particularity, other embodiments and arrangements may well suggest themselves to those skilled in the art, without departing from the spirit of the invention. References will be had, therefore, to the appended claims for a definition of the limits of the invention.

What is claimed is:

1. A composite arcuate liquid-cooled brake shoe adapted for frictional engagement with a brake lining, said shoe comprising in combination, an arcuate steel platform portion and a longitudinally extending steel reinforcing web welded to the concave side of said platform portion, a relatively thin arcuate metal working portion on the convex side of the platform portion formed of a metal containing copper and having a thermal conductivity of at least 40% of that of pure electrolytic copper and a melting point above 1500° F., a continuous integral rib on one side of one of said portions extending along the periphery of said one portion and brazed to the other portion along the entire length of the rib, said rib extending longitudinally along both of the sides of said one portion and laterally along the ends thereof, a plurality of integral longitudinal supporting ribs on said one side of said one portion in supporting engagement with the other of said portions, said supporting ribs being spaced laterally from each other and from the longitudinally extending portions of said continuous rib, the supporting ribs forming, in conjunction with said other portion and said continuous rib, longitudinal cooling liquid passages each substantially coextensive with said one portion and parallel with each other and the opposite ends of said supporting ribs being spaced from the lateral portions of the continuous rib to provide lateral passages connecting said longitudinal passages at either end thereof, and a single cooling liquid connection at each end of the shoe directly secured to the concave side of the steel platform portion and directly connecting with the corresponding lateral passage for conducting cooling liquid from one lateral passage to the other through said longitudinal and parallel cooling liquid passages in one direction only.

2. A composite arcuate liquid-cooled brake shoe as set forth in claim 1, wherein the steel platform portion has a smooth arcuate convex surface on the outer side thereof, and the continuous rib and the longitudinal ribs are formed on the concave side of the working portion of the shoe.

References Cited in the file of this patent

UNITED STATES PATENTS

| | | |
|---|---|---|
| 464,949 | Alden | Dec. 15, 1891 |
| 1,131,810 | Zoller et al. | Mar. 16, 1915 |
| 1,536,558 | Bukowsky | May 5, 1925 |
| 1,894,001 | Myers | Jan. 10, 1933 |
| 1,952,967 | Boughton | Mar. 27, 1934 |
| 2,195,130 | Hoyt | Mar. 26, 1940 |
| 2,468,388 | Wilson | Apr. 26, 1949 |
| 2,664,176 | Whalen | Dec. 29, 1953 |
| 2,747,702 | Van Zelm | May 29, 1956 |
| 2,821,271 | Sanford | Jan. 28, 1958 |
| 2,821,273 | Sanford et al. | Jan. 28, 1958 |

FOREIGN PATENTS

| | | |
|---|---|---|
| 482,556 | France | Jan. 5, 1917 |
| 670,452 | Germany | Jan. 19, 1939 |
| 896,915 | Germany | Nov. 16, 1953 |